United States Patent [19]
Hash et al.

(10) Patent No.: US 6,170,748 B1
(45) Date of Patent: Jan. 9, 2001

(54) OBJECT IDENTIFICATION SYSTEM EMPLOYING PULSED MAGNETIC FIELD-STIMULATED, TAG-EMBEDDED TRANSPONDER

(75) Inventors: Ronald J. Hash; Donald K. Belcher, both of Rogersville; Robert W. Boyd, Eidson, all of TN (US)

(73) Assignee: Widata Corporation, Sunnyvale, CA (US)

(*) Notice: Under 35 U.S.C. 154(b), the term of this patent shall be extended for 0 days.

(21) Appl. No.: 09/159,554

(22) Filed: Sep. 24, 1998

Related U.S. Application Data

(63) Continuation-in-part of application No. 08/779,302, filed on Jan. 6, 1997, now abandoned.
(60) Provisional application No. 60/060,185, filed on Sep. 26, 1997.

(51) Int. Cl.[7] .................................................. G06K 7/08
(52) U.S. Cl. .......................... 235/451; 235/385; 235/492; 340/572
(58) Field of Search ........................... 235/451, 375, 235/383, 385, 472.01, 492; 340/551, 571, 572

(56) References Cited

U.S. PATENT DOCUMENTS

| 3,723,862 | * | 3/1973 | Wentzel et al. | 340/282 X |
| 4,782,342 | * | 11/1988 | Walton | 235/380 X |
| 4,818,855 | * | 4/1989 | Mongeon et al. | 235/451 X |
| 5,099,227 | * | 3/1992 | Geiszlek et al. | 235/440 X |
| 5,340,968 | * | 8/1994 | Watanabe et al. | 235/380 |
| 5,382,784 | * | 1/1995 | Eberhardt | 235/383 X |
| 5,739,514 | * | 4/1998 | Uchida | 235/435 |
| 5,796,351 | * | 8/1998 | Yabuki | 235/383 X |
| 5,838,235 | * | 11/1998 | Thorigne | 235/449 X |
| 6,003,777 | * | 12/1999 | Kowalski | 235/451 X |

* cited by examiner

Primary Examiner—Michael G. Lee
(74) Attorney, Agent, or Firm—Allen, Dyer, Doppelt, Milbrath & Gilchrist, P.A.

(57) ABSTRACT

An object orientation-independent information storage and retrieval system 'tags' an object with a compact, strip-embedded transponder containing object identification information. The transponder remains unpowered until the tagged object passes through a pulsed time-varying magnetic field generated by a tag reader. In response to a transponder coil sensing this interrogation magnetic field, the transponder extracts and stores energy from the incident field, powering up the transponder and stimulating the emission of an alternating magnetic field reply burst encoded with information stored in memory. The reply burst has the same frequency as the interrogating magnetic field burst, and is emitted by the transponder coil prior to receipt of the next interrogation burst.

16 Claims, 3 Drawing Sheets

OBJECT IDENTIFICATION SYSTEM EMPLOYING PULSED MAGNETIC FIELD-STIMULATED, TAG-EMBEDDED TRANSPONDER

CROSS-REFERENCE TO RELATED APPLICATION

The present application is a continuation-in-part of parent U.S. patent application Ser. No. 08/779,302, filed Jan. 6, 1997, by D. Belcher et al, entitled: "Object Identification System Employing Orientation-Independent, Magnetic Field-Stimulated, Tag-Embedded Transponder, (now abandoned)," assigned to the assignee of the present application and the disclosure of which is incorporated herein. In addition, the present application claims the benefit of Provisional Patent Application Serial No. 60/060,185, filed Sep. 26, 1997, entitled: "Wibar Signaling Scheme," assigned to the assignee of the present application and the disclosure of which is incorporated herein.

FIELD OF THE INVENTION

The present invention relates in general to object identification systems, and is particularly directed to a pulsed magnetic field-based, tagged object information storage and retrieval system, that operates independently of the orientation of the information storage medium or 'tag' placed on the object. When interrogated by a repetitively pulsed exciting magnetic field generated by a tag reader, a tag transponder embedded in the tag pauses to allow its circuitry to settle, and then emits a pulse position modulation (PPM) response magnetic field waveform at the same frequency as and prior to the next exciting pulse.

BACKGROUND OF THE INVENTION

The identification of objects, such as packages, retail sales items, shipping containers, and the like, is often accomplished by affixing an information storage medium such as a 'bar code' label to an object. The bar code is encoded with previously assembled and stored information that fully describes the object. In order to read the label, the object must be oriented so that the bar code may be 'viewed' by an optical (e.g. laser) scanner, either as a stationary device or a hand held unit.

A familiar example of the use of such a scanner is a check-out line of a retail sales establishment, where a clerk orients each item with the bar code label face down, and then passes the item across a generally horizontal viewing window. As the object is passed over the window, the bar code is read by the scanner located beneath the window, which outputs data to an adjacent point-of-sales terminal, where the sales transaction is processed. If the object is not properly oriented to allow the scanner to read the label, the sales clerk will not hear an audible tone confirming success of the scan, and will repeat the process.

A similar technique is employed in the transportation industry, where items (e.g., baggage) being unloaded from a vehicle (e.g, aircraft) are placed upon a conveyor belt in a prescribed orientation, so that they may be viewed by the scanner. If the object has not been properly placed on the conveyor, the object will require further handling by other personnel to properly orient the bar code label so that it can be read by a downstream (stationary or hand held) scanner. This need to physically orient encoded label-containing items relative to an optical scanner is both labor-intensive and time-consuming, and constitutes an unwanted expense.

Non-limiting examples of proposals to address this problem include a variety of transponder tag-based systems, such as those described in the Bickley et al, U.S. Pat. No. 5,430,441; Watanabe et al, U.S. Pat. No. 5,478,991; and Brooks et al, U.S. Pat. No. 5,485,154. In each of these schemes, the tag is powered by an exciting source that continuously generates an exciting magnetic field to power the tag. In the Bickley et al and Watanabe et al approaches the tag responds by modulating the continuously transmitted field. In the Brooks et al scheme, the tag responds by generating a signal at a frequency different from the exciting frequency to avoid interference. An obvious drawback of each patented approach is the fact that they continuously consume power. Indeed, in the Brooks et al scheme, the amount of excitation energy required is so large, that it requires the use of a shielded tunnel to prevent electromagnetic contamination of the surrounding environment.

SUMMARY OF THE INVENTION

In accordance with the present invention, both the physical handling and orientation problems associated with conventional bar code label scan systems, and the power consumption shortcomings and circuitry complexity of continuously operated sources, such as those of the above-described patented schemes, are successfully obviated by a pulsed magnetic field-based information storage and retrieval system, which tags an object with a normally unpowered transponder containing memory for storing object identification information.

The tag transponder of the invention operates independently of its orientation and is powered by a low duty cycle, pulsed (rather than continuous) magnetic field, through which a tag access unit, such as a tag reader or a writer repetitively 'pings' the tag. This pulsed magnetic field is sensed by a coil in the tag and provides a power burst that stimulates the transponder's circuitry to either capture and store information embedded in the pulse during write mode, or to respond to a read or interrogate 'ping' by emitting a PPM magnetic field waveform containing object identification information stored in non-volatile transponder memory.

Once powered up during read mode, in response to each magnetic field pulse, the tag's transponder pauses or waits for a prescribed stabilization and data bit defining interval before emitting a PPM reply waveform. The PPM reply magnetic signal is transmitted at the same frequency as the exciting pulse, prior to the next exciting pulse from the reader. AT the reader, the transponder's magnetic reply signal may be detected by a coil that is separate from that used to generate the tag-excitation magnetic field.

In a preferred, but non-limiting, embodiment of the invention, the tag transponder may be affixed to flexible strip of rugged, protective material, such as Mylar. To provide magnetic field powering of and emission of a PPM response signal from the flexible strip-mounted transponder, a thin conductive coil is embedded in the Mylar and coupled to respective power terminals of the tag's transponder circuitry. In response to a pulsed interrogation magnetic field generated by the tag reader, a voltage sufficient to power the transponder's microcircuit is induced across the power terminals in proportion to the time derivative of the magnetic field passing through the coil.

The transponder circuitry includes a power burst storage capacitor that stores energy during successive positive half cycles of an alternating interrogation magnetic field burst. This power burst storage capacitor is used to power the components of the transponder circuitry. The transponder coil is further coupled to a reply energy storage capacitor, which is coupled through a diode oriented such that the reply energy storage capacitor stores energy during successive negative half cycles of a received burst.

During read/response mode, the energy stored in the reply energy storage capacitor is used in conjunction with the tag's coil and a controllably gated FET switch coupled across the diode to generate a PPM modulated alternating magnetic field at the same frequency of the magnetic field read burst to be emitted from the coil, and containing (tag identification) information stored in memory.

During write mode, information to be programmed or written into the tag may be encoded in the repetitively transmitted tag-powering magnetic field bursts. For on-the-fly applications, the tag transponder's memory may be programmed electronically by means of a programmable voltage pulse generator, or magnetically by means of a write coil and a shielded programmable magnetic field generator, into which the transponder-embedded strip is inserted at the time of use.

To control the mode and timing of the operation of the transponder's circuitry, the tag coil is further coupled through a rectifier to a counter, which is operative to count positive half cycles contained in each magnetic field burst from the reader. The number of cycles within a read burst is different from that for a write mode of operation. The count output is used to initiate and control the mode of operation of a state machine. During read mode the state machine accesses object information data that has been previously written to or stored in non-volatile memory in preparation for transmission of successive bits of the stored object identification data during successive PPM reply waveforms.

The state machine has an output coupled to an FET switch, the source-drain path of which is coupled across the diode in circuit with the reply energy storage capacitor. During a reply window between successive read pulses, the state machine briefly turns on or gates the FET switch, so as to apply energy stored in the capacitor to the transponder's coil and thereby cause a prescribed number of cycles of an alternating magnetic field at the same frequency of the magnetic field read burst to be emitted as a response signal from the tag coil. The time position of this pulsed reply waveform relative to the most recently received interrogation pulse is representative of the binary state of the data bit to be transmitted.

Because response or replay burst waveforms are generated between interrogation bursts from the reader, the tag transponder of the invention is not required to overcome or modulate the exciting signal, so that the battery unaided range of operation of the transponder is greatly increased. The circuit complexity of the tag's transponder is considerably reduced compared with the prior art schemes referenced above, since the response magnetic field waveform pulsed from the tag's sense—reply coil is at the same frequency as the interrogating magnetic field burst and uses the same coil for both receiving energy and responding to the interrogation pulse.

For pulse position modulation-based transmission, a 'zero' bit response may be associated with a relatively shorter delay interval that occupies a relatively 'earlier' position within the response window between successive interrogation pulses, whereas a 'one' bit response may be associated with a relatively longer delay interval, so that it occupies a relatively 'later' position within the response window. In addition, to add another layer of modulation, the phases of the two bit positions may be inverted with respect to one another to effect phase shift keying (PSK) of the tag's response signal.

The reader used to interrogate the tag may include a pulse generator, which is coupled to a multiple interrogate—read coil arrangement. The read coil arrangement may comprise a pair of spaced apart coils positioned on opposite sides of a conveyor, so that the coil of a tag transponder affixed to a container or package on the conveyor will intercept the pulsed exciting magnetic field. The link from/to the coil arrangement is further coupled to a clamp circuit, which limits the signal amplitude of PPM reply magnetic field pulses generated by the tag transponder during the successive response windows.

The clamp circuit is coupled through a band pass filter tuned to the frequency of the response waveform to an analog-to-digital converter. The output of the converter is coupled to a correlator, which decodes the PPM response waveform emitted from the interrogated tag's transponder. The pulse generator also outputs a blanking signal during the generation of the successive magnetic field bursts. This blanking signal is used to effectively disable the reader circuitry during intervals when successive interrogation magnetic field pulses are being generated by the reader.

To optimize the robustness of the independence of the tag information storage and retrieval system of the present invention to package or container orientation, the reader coil arrangement includes a plurality of spaced apart magnetic field excitation coil pair arrangements which produce mutually orthogonal magnetic fields. As a result, as a package to which the tag/transponder is affixed travels along a conveyor, the tag's read/response coil will encounter the field produced by at least one of the coil pairs. This ensures that regardless of its package orientation, the tag/transponder cannot escape detection, since all tag orientations will be coupled to at least one of the three excitation fields produced by the coil arrangements. The responses of the respective coil arrangements are coupled to associated readers, outputs of which are coupled to a data arbitration processor, which is operative to arbitrate among its three inputs, using a conventional arbitration mechanism, to produce a single data output that uniquely identifies the tagged object.

In a portable embodiment of the invention, the pulse generator and reader circuitry may be housed in a compact, hand-held 'gun' configured arrangement, such as one made of shock resistant plastic. In this embodiment, a read/response coil is wound around a ferrite rod housed in a barrel portion of the gun, and coupled to pulse generator and reader circuitry installed in a hand grip and activated by a trigger switch. Access to and power for the circuitry of the gun configuration is readily accomplished by a power and data cable coupled to the hand grip.

DETAILED DESCRIPTION

As pointed out briefly above, the repetitively pulsed magnetic field-based information storage and retrieval system of the invention provides a normally unpowered, object-tagged transponder that is stimulated into operation or powered by the energy contained in a modulated magnetic field burst signal. The mode of operation (read/reply or write/store) of the transponder is readily definable by the number of cycles within the magnetic field burst. For a write mode of operation, the data encoded in each pulsed magnetic field burst emitted by a tag 'writer' is captured by and written into non-volatile memory on board the tag's transponder.

For a read mode of operation, the transponder emits a sequence of pulse position modulation (PPM)-formatted magnetic pulse response messages containing object identification data, that is transmitted one bit at the time between successive excitation pulses from the reader. The reply magnetic signal is transmitted at the same frequency as the exciting magnetic field. A tag reader is configured to receive and decode these response signals irrespective of the orientation of the object.

Figure 1:
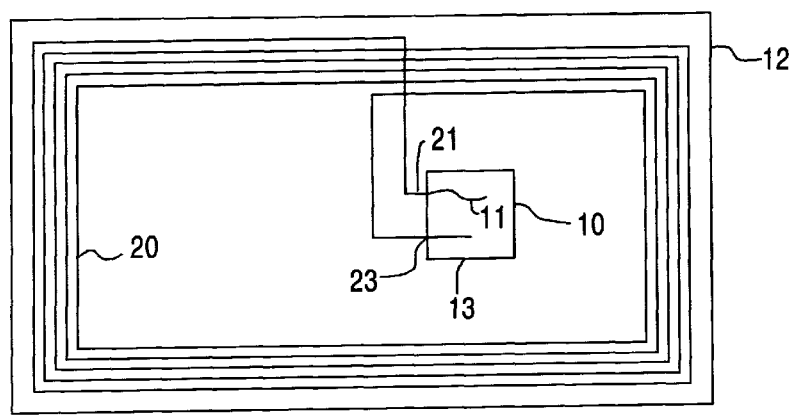
FIG. 1 diagrammatically illustrates a pulsed magnetic field responsive tag transponder of an embodiment of the invention.
Figure 2:
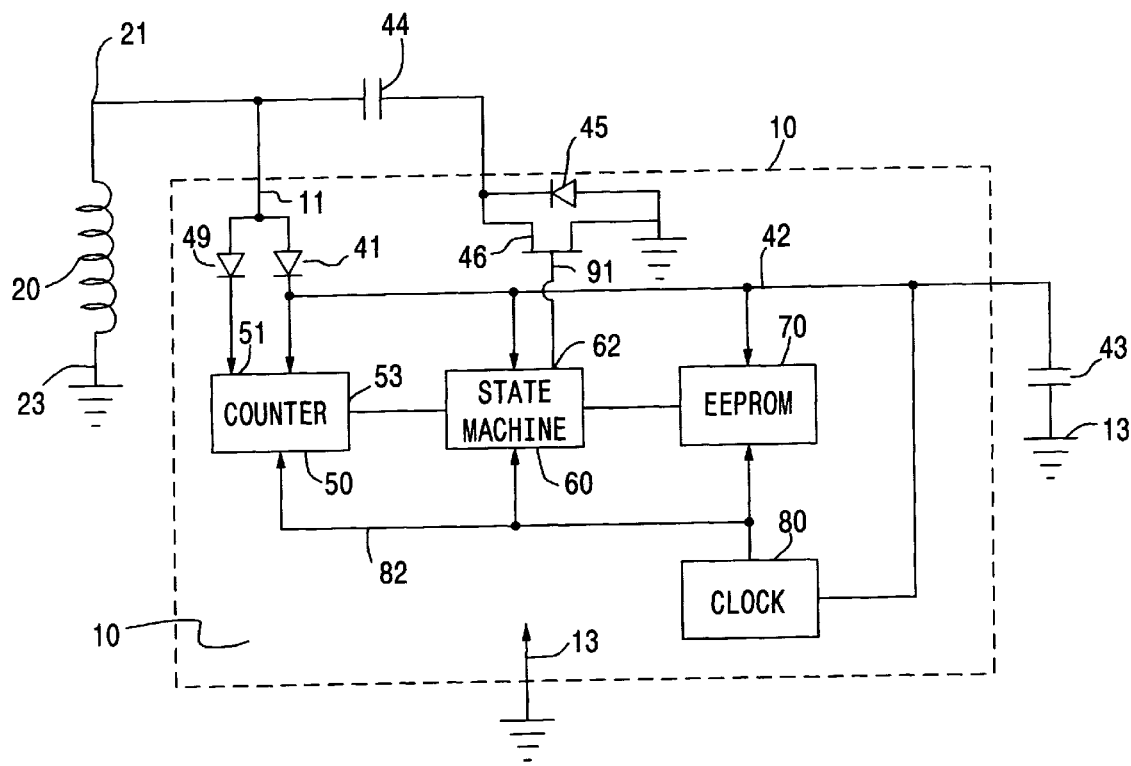
FIG. 2 shows the circuit architecture of the tag transponder of FIG. 1.

FIG. 1 diagrammatically illustrates a tag/transponder in accordance with the invention, which is preferably implemented as a microcircuit shown in detail in FIG. 2, to be described. The tag/transponder, shown at 10, may be embedded in or attached to an adhesively backed, flexible strip 12 of rugged, protective material, such as Mylar. To provide wireless (magnetic field-based) powering of and stimulate the transmission of a reply message from the transponder's circuitry, the flexible protective strip 12 further includes a thin conductive coil 20, such as a multi-turn (spiral-configured) layer of copper ribbon.

Terminal ends 21 and 23 of the coil 20 are coupled to respective power bus leads 11 and 13 through which power is supplied to the components of the transponder 10. The number of turns of the coil 20 is selected in accordance with the excitation magnetic field level with which it is expected to operate. For relative low magnetic field excitation levels, the coil 20 may have a relatively large number of turns (e.g., fifty or more, as a non-limiting example).

Figure 3:
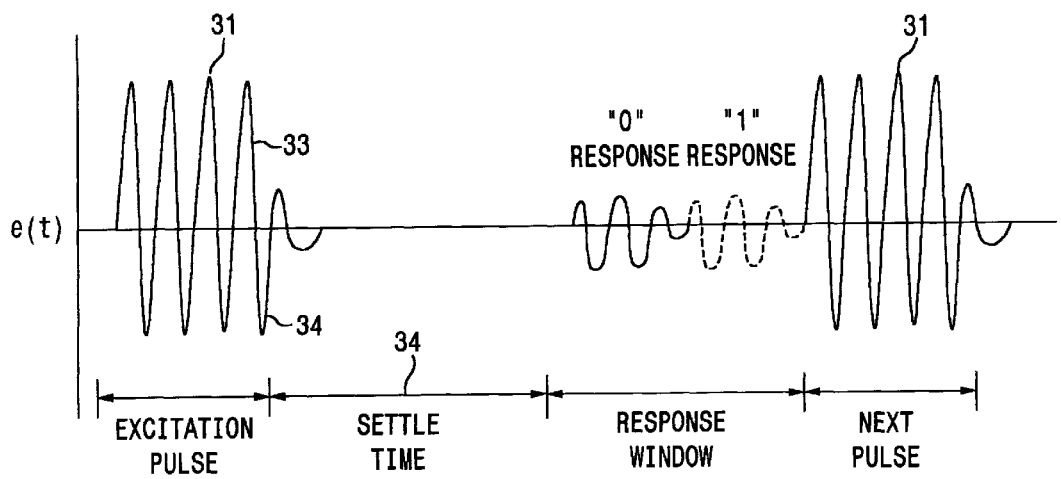
FIG. 3 shows a pulsed magnetic field sequence associated with the operation of the tag transponder of FIG. 2.
Figure 5:
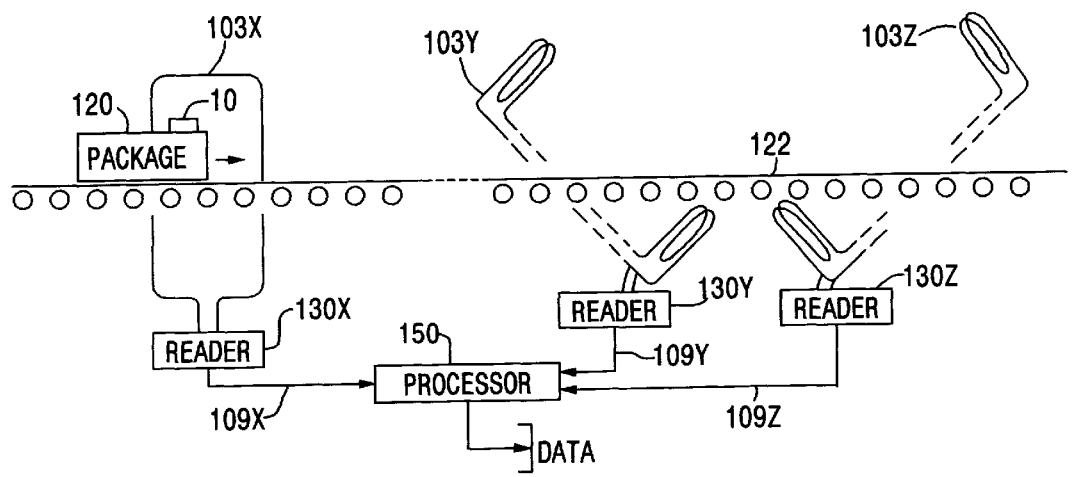
FIG. 5 diagrammatically illustrates a plurality of spaced apart magnetic field excitation coil arrangements that produce mutually orthogonal magnetic fields through which a package is sequentially conveyed.

When the coil 20 is intercepted by or passes through a time varying or alternating magnetic field burst, such as the low duty cycle repetitive excitation pulse shown at 31 of the time varying waveform e(t) of FIG. 3, and produced by the tag reader diagrammatically illustrated in FIG. 5, a voltage is induced across the transponder's power bus leads 11 and 13 in proportion to the time derivative of the alternating magnetic field passing through the coil. Depending upon the strength of the alternating magnetic field burst and component parameters, a voltage on the order of two to three volts, which is sufficient to power the transponder 10, is induced across power bus leads 11 and 13.

As shown in detail in FIG. 2, the transponder circuitry 10 comprises a first half-wave rectifier diode 41 coupled in circuit with the power bus lead 11 from coil 20 through a power bus 42 to a first power burst storage capacitor 43, which is coupled to a reference potential terminal (GND), to which the power bus lead 13 from coil 20 is coupled. The orientation of diode 41 is such that the power burst storage capacitor 43 stores energy during successive positive cycles 33 of the magnetic field burst 31. The power burst storage capacitor 43 is used to power the components of the transponder circuitry by way of the power bus 42.

The terminal end 21 of the transponder coil 20 is further coupled to a reply burst/pulse energy storage capacitor 44, which is coupled to ground through a second half-wave rectifier diode 45. Diode 45 has a polarity orientation such that the reply burst energy storage capacitor 44 stores energy during successive negative half cycles 34 of a received excitation pulse burst. The energy stored in capacitor 44 is used in conjunction with coil 20 and a controllably gated FET switch 46, coupled across diode 45 to generate a PPM modulated alternating magnetic field at the same frequency of the magnetic field read burst to be emitted from the coil 20, and containing information stored in the transponder's non-volatile memory during the read/response mode of operation, as will be described.

The coil 20 is further coupled through a third half-wave rectifier diode 49 to a pulse input 51 of a counter 50. Through diode 49, counter 50 counts the positive cycles contained in each relatively large amplitude, time varying interrogation magnetic field burst 31 from the reader, in order to determine the mode of operation of the transponder. As described above, the number of cycles within the burst period of the excitation pulse 31 for a read mode of operation (in which the reader stimulates the tag's transponder to emit a response message) is different from (e.g., less than) that for a write mode of operation, during which object identification information is written to the tag.

The output 53 of the counter 50 initiates and controls the mode of operation of a state machine 60. When enabled during a 'read' or 'response' mode of operation, the state machine 60 accesses object information data that has been previously written to or stored in a non-volatile (NX1) memory (shown as an EEPROM) 70, in preparation for transmission of successive bits of the stored object identification data during successive PPM reply messages formatted as shown in the timing diagram of FIG. 3.

Each of the counter 50, state machine 60 and memory 70, as well as a clock generator 80, is powered by the power bus 42 from the energy stored in capacitor 43, as shown. Operation of the counter 50, state machine 60 and memory 70 is controlled by clock signals applied over a clock signal line 82 from the clock generator 80. The frequency of the clock signals generated by clock generator 80 is considerably higher than the frequency of the alternating cycles of a magnetic field burst.

The state machine 60 has an output 62 that is coupled to the gate input 91 of FET switch 46, the source-drain path of which is coupled across diode 45, as described above. With diode 45 coupled in circuit with reply energy storage capacitor 44, selectively pulsing or turning the FET switch 46 on for a brief response window or interval by the output 62 of state machine 60 during read mode of operation will cause the application of the energy stored in capacitor 44 to the transponder's coil 20, and thereby cause a reduced amplitude alternating magnetic field waveform, shown as one of a "0" response waveform 35 and a "1" response waveform 36 in FIG. 3, to be emitted from the coil 20 during a selected portion of a PPM response window 37.

For write or data storage mode of operation, the state machine 60 maintains its output 62 in a disabled state, so that FET switch is 46 not turned on. During write mode of operation, the value of a respective data bit is encoded into the excitation pulse 31 of the magnetic field burst. As will be described, as successive excitation bursts are received the contents of the excitation pulse are counted by counter 50, and read by the state machine 60 to be downloaded into memory 70.

As described above, the mode of operation (read or write) of the transponder 10 is defined in accordance with the number of cycles within the excitation pulse period 31 of a magnetic field burst. For purposes of providing a non-limiting example, the read mode of operation may be associated with a smaller number of cycles (e.g., four in the illustrated pulse 31 of FIG. 3), than write mode (e.g., eight or more cycles per burst). Namely, during the read mode of operation, counter 50 will count a fewer number of positive cycles in each of the magnetic field bursts successively detected by coil 20 and rectified by diode 49.

After receipt of a prescribed number of successive magnetic field bursts 31 that has been determined to be sufficient to power up the tag (e.g., 100, as a non-limiting example), the components of the tag transponder circuitry of FIG. 2 will have been powered up from the voltage on the power bus 42, derived from the energy rectified by diode 41 and stored in capacitor 43, so that clock generator 80 will begin clocking the operation of each of counter 50, state machine 60 and memory 70. With the transponder circuitry enabled, the counter 50 will begin counting the number of positive cycles of each magnetic field burst 31. At the end of each burst, counter 50 provides an output 53 to the state machine 60 representative of the number of pulses counted, and therefore whether the transponder is in read or write mode.

For read mode of operation, the state machine 60 begins reading out object identification data (e.g., one bit at the time) stored in non-volatile memory 70 into a set of internal registers within the state machine, in accordance with the clock signal produced by clock generator 80. Upon completion of, or alternatively in parallel with, this data transfer operation, the state machine 60 begins a reply transmission time delay or count interval associated the binary state of the data bit to be transmitted.

As shown in the non-limiting example of the pulse waveform of FIG. 3, this time delay interval includes a front end quiescent period 34, that allows the environment to settle electrically after the termination of a burst 31 before a reply transmission is initiated by the transponder's circuitry. Following this settling time interval 34, and prior to the next magnetic field burst 31 from the reader is the PPM response window 37. During this response window, the state machine 60 triggers the FET switch 46, so that the transponder emits an alternating magnetic field reply signal in accordance with the value of the data bit accessed from memory (either a "0" or a "1").

As described above, the FET switch 46 is selectively turned on by the output 62 of the state machine 60 during the data-associated portion (35/36) of the response window 37 between successive magnetic field bursts 31. Because the response emissions occur between interrogation bursts from the reader, the tag transponder of the invention is not required to overcome or modulate the exciting signal, so that the range of operation of the transponder (without the need of a battery) is greatly increased. When the FET switch 46 is turned on, it places a short across diode 45, so that charge stored in the capacitor 44 is applied to the transponder's coil 20, to cause a prescribed number of cycles of an alternating magnetic field at the same frequency of the magnetic field read burst to be emitted as a response signal 35/36 from the coil 20. It will be readily appreciated that the circuit complexity of the tag's transponder is considerably reduced compared with the prior art schemes described above, since the response magnetic field waveform pulsed 35/36 from the coil 20 is at the same frequency as the interrogation burst 31 and uses the same coil for both receiving energy and responding to the interrogation pulse.

As shown in FIG. 3, for pulse position modulation-based transmission, a 'zero' bit response may be associated with a relatively shorter delay interval, which occupies a relatively 'earlier' position 35 within the response window 37, whereas a 'one' bit response may be associated with a relatively longer delay interval, so that it occupies a relatively 'later' position 36 within the response window 37, as a non-limiting example. Conversely, the 'one' and 'zero' bit delay intervals and their associated positions within the response window 37 may be reversed from those shown in FIG. 3, without departing from the scope of the invention. In addition, to add another layer of modulation, the phases of the two bit positions may be inverted with respect to one another to effect phase shift keying (PSK) of the response signal.

Figure 4:
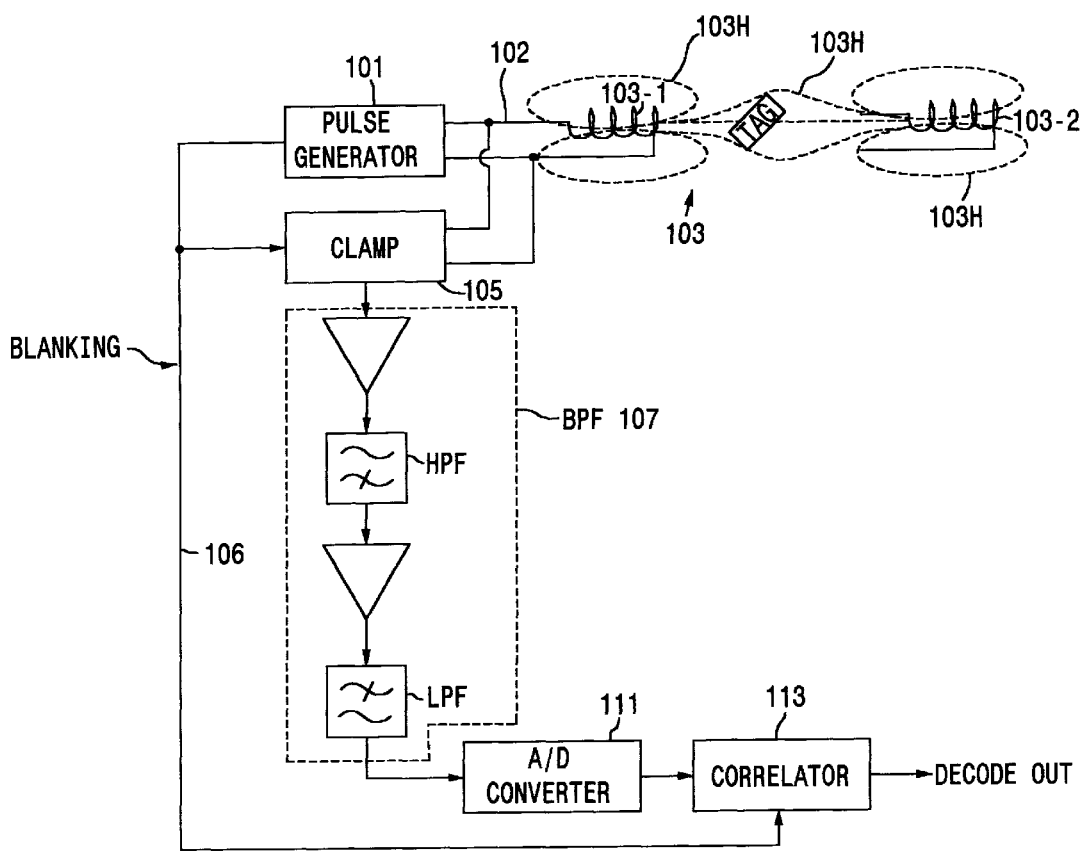
FIG. 4 diagrammatically the architecture of a tag reader used to interrogate the tag transponder of FIGS. 1 and 2.

The circuitry of the tag reader is diagrammatically illustrated in FIG. 4 and includes a pulse generator 101, which generates the pulsed sinusoidal signal 31 shown in FIG. 3, such as a pulsed 100 KHz waveform. The output of pulse generator 101 is coupled over a link 102 to a multiple interrogate or reader coil arrangement 103. The reader coil arrangement 103 may comprise a pair of spaced apart coil elements 103-1, 103-2 positioned on opposite sides of a conveyor, such as shown diagrammatically in FIG. 5, to be described. During successive (periodic) interrogation of the tags, the reader coil arrangement 103 generates a 'pseudo' constant magnetic field, shown by flux lines 103H that includes a region between the two coil elements, so that the coil 20 of a tag transponder 10 affixed to a container or package on the conveyor will intercept the pulsed field.

For reading the PPM response from an interrogated tag, the link 102 from the coil arrangement 103 is further coupled to a selectively disabled clamp circuit 105 (such as a controlled hard limiter), which is controllably disabled by a blanking signal on line 106, that is coincident with the interval of the excitation pulses 31, to prevent excitation pulses 31 from the pulse generator 102 from being applied to downstream response signal processing components. The blanking signal on line 106 is also coupled to correlator 113. The blanking signal effectively disable the reader circuitry during time intervals when successive interrogation magnetic field pulses 31 are being generated by the pulse generator 101.

Clamping circuit 105 is operative to limit the signal amplitude of PPM reply magnetic field pulses generated by the tag transponder during the successive response windows 37 described above. The output of the clamp circuit 105 is coupled through a band pass filter 107, tuned to the frequency of the pulsed magnetic field and response waveforms, to an analog-to-digital (A–D) converter 111. The digitized output of A–D converter 111 is coupled to a correlator 113, which is operative to decode the PPM response emitted from the interrogated tag's transponder.

FIG. 5 diagrammatically illustrates the manner in which the interrogate or reader coil arrangement 103 is configured to optimize the robustness of the independence of the tag information storage and retrieval system of the present invention to package or container orientation. As shown therein, the coil arrangement includes a plurality of spaced apart magnetic field excitation coil pair arrangements 103X, 103Y and 103Z, which produce mutually orthogonal magnetic fields. As a consequence, as a package 120 to which the tag/transponder 10 described herein is affixed travels along a conveyor 122, the tag's read/response coil will encounter the field produced by each of coil pairs 103X, 103Y and 103Z. This ensures that regardless of its package orientation, the tag/transponder 10 cannot escape detection, since all tag orientations will be coupled to at least one of the three excitation fields produced by the coil arrangements 103X, 103Y, 103Z.

The responses of the respective coil arrangements 103X, 103Y and 103Z are coupled to associated readers 130X, 130Y and 130Z, each of which is configured as shown in FIG. 4, described above. The outputs of the readers are coupled over respective links 109X, 109Y and 109Z to a data arbitration processor 150, which is operative to arbitrate among its three inputs, using a conventional arbitration mechanism (as by selecting the input with the lowest number of errors), to produce a single data output that uniquely identifies the tagged object.

Figure 6:
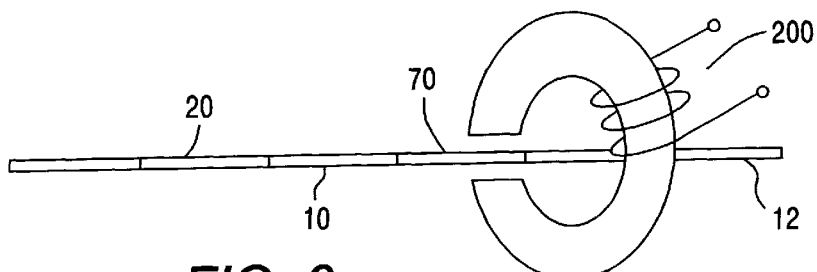
FIG. 6 diagrammatically illustrates a magnetic field generator coil, into which a Mylar strip containing the tag transponder of FIG. 1 may be inserted and programmed.

As pointed out previously, the non-volatile memory 70 of the tag's transponder circuit 10 contains a previously stored encoded sequence of binary values ('0's and '1's), representative of the desired object identification information. Depending upon the application, this object ID information may be encoded and downloaded in to the tag's non-volatile memory 70 in a number of ways. For applications where large numbers (e.g., millions) of tags employ the same object identification information or code sequence, the memory 70 of the transponder of FIG. 2 may be laser-programmed ('burned-in'), or alternatively provided with a prescribed metalization pattern at the time of manufacture. As shown diagrammatically in FIG. 6, for on-the-fly applications, such as in the transportation industry, the transponder's memory 70 may be programmed magnetically by means of a write coil 200 and a shielded programmable magnetic field generator, into which the transponder-embedded Mylar strip 12 is inserted at the time of its use, or by the use of gun unit 210.

As described above, when programming the tag, namely writing object identification information into the transponder's non-volatile memory 70, the number of cycles within the burst period 31 for a write mode of operation (in which the reader stimulates the tag's transponder to store the contents of the magnetic field burst) is not only different from (e.g., greater than) that for the read mode of operation, but may be used to represent the data to be stored into the tag. Just as in the write mode of operation, upon receipt of a prescribed number of successive magnetic field bursts 31 sufficient to power up the tag (e.g., 100, as a non-limiting example), the tag transponder circuitry will have been powered up from the voltage on the power bus 42, from the energy rectified by the diode 41 and stored in capacitor 43, so that clock generator 80 will begin clocking the operation of each of counter 50, state machine 60 and memory 70.

With the transponder circuitry enabled, counter 50 begins counting the number of positive cycles of each magnetic field burst 31. Since, in this mode of operation, the value of a respective data bit is encoded as a prescribed pulse waveform of a magnetic field burst 31, then as successive positive cycles 33 of a data bit are counted by counter 50, they are read by the state machine 60 and downloaded into memory 70. Thus, the operation of the write mode is substantially complementary to that of the read mode, except that the state machine 60 captures data encoded in the incident magnetic field excitation burst 31.

Figure 7:
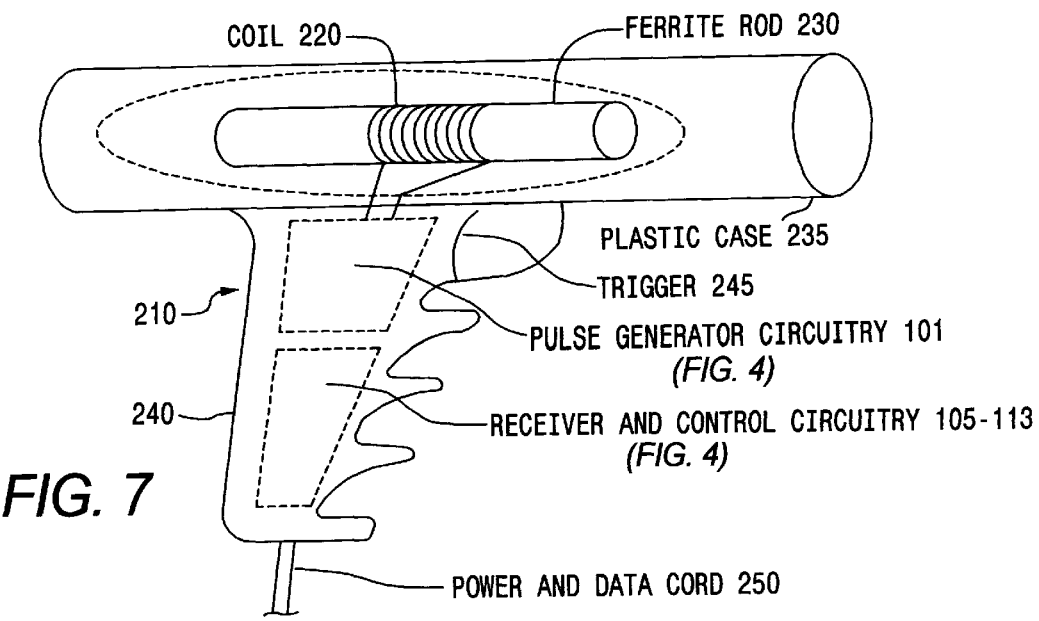
FIG. 7 diagrammatically shows the configuration of a hand-held tag reader.

FIG. 7 diagrammatically shows the configuration of a further embodiment of the invention in which pulse generator and reader circuitry of FIG. 4 may be housed in a compact, hand-portable 'gun' configured arrangement 210, made of ruggedized, shock-resistant plastic. In this embodiment, an interrogate coil 220 is wound around a ferrite rod 230, housed in a barrel portion 235 of the gun. The coil 220 is coupled to the pulse generator and reader signal processing circuitry of FIG. 4 that are installed in a hand grip 240, and activated by a trigger switch 245. Access to and power for the circuitry of the configuration of FIG. 7 is readily accomplished by a power and data cable 250 coupled to the hand grip 240.

Where such a compact coil architecture is employed for short range coverage, it may be advantageously integrated with an associated receive coil pair and configured in the manner shown in FIG. 1 of co-pending patent application, Ser. No. 09/159,555, filed coincident herewith, entitled: "Short Range Magnetic Field Transducer," by R. Hash et al, assigned to the assignee of the present application and the disclosure of which is incorporated herein. As described in the co-pending application, the receiver coils are arranged close to the ends of the excitation coil and are connected in opposite polarity, so that energy from the excitation coil and relatively distant sources is canceled, while producing a useful net output for the field produced by a nearby (object-tagged) transponder.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of storing and retrieving information representative of at least one characteristic of an object comprising the steps of:

(a) attaching to said object a normally unpowered transponder having programmable memory for storing said information representative of at least one characteristic of said object;

(b) generating a magnetic field burst signal containing a plurality of magnetic field cycles of a prescribed magnetic field variation frequency, such that said magnetic field burst signal impinges upon said transponder;

(c) in response to receiving said magnetic field burst generated in step (b), causing said transponder to be powered from energy contained in said magnetic field burst signal; and (d) during a prescribed interval of time subsequent to receipt of said magnetic field burst in step (c), causing said transponder to emit a response magnetic field burst containing a plurality of cycles of said frequency, said prescribed interval of time being associated with information stored in said programmable memory; and wherein step (b) comprises repetitively generating said magnetic field burst signal at successive burst intervals spaced apart in time by quiescent intervals therebetween;

step (c) comprises storing energy contained in received successive magnetic field burst signals; and step (d) comprises emitting successive response magnetic field bursts during respective intervals of time between said successive magnetic field bursts received in step (c), each respective interval of time being delayed relative to termination of an immediately preceding received magnetic field burst by a delay interval defined by information accessed from said programmable memory.

2. A method of storing and retrieving information representative of at least one characteristic of an object comprising the steps of:

(a) attaching to said object a normally unpowered transponder having programmable memory for storing said information representative of at least one characteristic of said object;

(b) generating a magnetic field burst signal containing a plurality of magnetic field cycles of a prescribed magnetic field variation frequency, such that said magnetic field burst signal impinges upon said transponder;

(c) in response to receiving said magnetic field burst generated in step (b), causing said transponder to be powered from energy contained in said magnetic field burst signal; and (d) during a prescribed interval of time subsequent to receipt of said magnetic field burst in step (c), causing said transponder to emit a response magnetic field burst containing a plurality of cycles of said frequency, said prescribed interval of time being associated with information stored in said programmable memory; and wherein step (d) comprises, during a prescribed portion of a response window subsequent to receipt of said magnetic field burst in step (c), causing said transponder to emit a response magnetic field burst containing a plurality of cycles of said frequency, said prescribed portion of said response window being associated with information to be transmitted from said transponder during said response window.

3. A method according to claim 2, wherein step (d) comprises encoding information to be transmitted during said response window in terms of the phase of said plurality of cycles of said response magnetic field burst.

4. A method of storing and retrieving information representative of at least one characteristic of an object comprising the steps of:

(a) attaching to said object a normally unpowered transponder having programmable memory for storing said information representative of at least one characteristic of said object;

(b) generating a magnetic field burst signal containing a plurality of magnetic field cycles of a prescribed magnetic field variation frequency, such that said magnetic field burst signal impinges upon said transponder;

(c) in response to receiving said magnetic field burst generated in step (b), causing said transponder to be powered from energy contained in said magnetic field burst signal; and (d) during a prescribed interval of time subsequent to receipt of said magnetic field burst in step (c), causing said transponder to emit a response magnetic field burst containing a plurality of cycles of said frequency, said prescribed interval of time being associated with information stored in said programmable memory; and wherein said transponder includes a coil, step (c) comprises sensing said magnetic field burst generated in step (b) by way of said coil, step (d) comprises causing said transponder to emit said response magnetic field burst by way of said coil; and said transponder coil is coupled in circuit with a plurality of energy storage devices that extract and store power to operate said transponder, and provide for emission of said response magnetic field burst, from energy contained in said received successive magnetic field burst signals.

5. A method according to claim 4, wherein step (d) comprises controllably discharging energy stored in one of said energy storage devices through said coil during said prescribed interval of time subsequent to receipt of said magnetic field burst in step (c), and thereby cause said transponder to emit said response magnetic field burst containing a plurality of cycles of said frequency.

6. A method of storing and retrieving information representative of at least one characteristic of an object comprising the steps of:

(a) attaching to said object a normally unpowered transponder having programmable memory for storing said information representative of at least one characteristic of said object;

(b) generating a magnetic field burst signal containing a plurality of magnetic field cycles of a prescribed magnetic field variation frequency, such that said magnetic field burst signal impinges upon said transponder;

(c) in response to receiving said magnetic field burst generated in step (b), causing said transponder to be powered from energy contained in said magnetic field burst signal;

(d) during a prescribed interval of time subsequent to receipt of said magnetic field burst in step (c), causing said transponder to emit a response magnetic field burst containing a plurality of cycles of said frequency, said prescribed interval of time being associated with information stored in said programmable memory; and (e) receiving said response magnetic field burst emitted in step (d) and recovering said information; and wherein step (b) comprises generating said magnetic field burst signal by way of a magnetic field coil arrangement that is configured to produce a magnetic field intercepting said transponder irrespective of the orientation of said transponder, and wherein step (e) comprises receiving said response magnetic field burst emitted in step (d) by way of said magnetic field coil arrangement.

7. A method of storing and retrieving information representative of at least one characteristic of an object comprising the steps of:

(a) attaching to said object a normally unpowered transponder having programmable memory for storing said information representative of at least one characteristic of said object;

(b) generating a magnetic field burst signal containing a plurality of magnetic field cycles of a prescribed magnetic field variation frequency, such that said magnetic field burst signal impinges upon said transponder;

(c) in response to receiving said magnetic field burst generated in step (b), causing said transponder to be powered from energy contained in said magnetic field burst signal;

(d) during a prescribed interval of time subsequent to receipt of said magnetic field burst in step (c), causing said transponder to emit a response magnetic field burst containing a plurality of cycles of said frequency, said prescribed interval of time being associated with information stored in said programmable memory; and (e) receiving said response magnetic field burst emitted in step (d) and recovering said information; and wherein wherein step (b) comprises generating said magnetic field burst signal by way of a magnetic field coil arrangement supported in a hand-portable housing, and wherein step (e) comprises receiving said response magnetic field burst emitted in step (d) from said magnetic field coil arrangement and recovering said information by way of signal processing circuitry coupled thereto and installed in said hand-portable housing.

8. A method of storing and reading information associated with an object comprising the steps of:

(a) providing said object with a tag containing a normally unpowered transponder that contains memory in which said information is stored;

(b) causing a magnetic field burst containing a plurality of cycles of an alternating magnetic field to be incident upon said tag during successive spaced apart intervals in time; and (c) for each magnetic field burst incident upon said tag in step (b), extracting energy therefrom for powering said transponder and stimulating said transponder to emit an alternating magnetic field reply burst that is encoded with a portion of said information stored in memory, a respective magnetic reply burst having a frequency corresponding to that of said alternating magnetic field, and being transmitted prior to receipt of the next magnetic field of step (b); and wherein step (c) comprises, during a prescribed portion of a response window subsequent to receipt of said magnetic field burst incident upon said tag in step (b), causing said transponder to emit a response magnetic field burst containing a plurality of cycles of said frequency, said prescribed portion of said response window being associated with information to be transmitted from said transponder during said response window.

9. A method according to claim 8, further including the step (d) of receiving said response magnetic field burst emitted by said transponder in step (c), and recovering said information.

10. A method according to claim 8, wherein said transponder includes a coil, and wherein step (c) comprises sensing said magnetic field burst generated in step (b) by way of said coil, and causing said transponder to emit said response magnetic field burst by way of said coil.

11. A method of storing and reading information associated with an object comprising the steps of:

(a) providing said object with a tag containing a normally unpowered transponder that contains memory in which said information is stored;

(b) causing a magnetic field burst containing a plurality of cycles of an alternating magnetic field to be incident upon said tag during successive spaced apart intervals in time; and (c) for each magnetic field burst incident upon said tag in step (b) extracting energy therefrom for powering said transponder and stimulating said transponder to emit an alternating magnetic field reply burst that is encoded with a portion of said information stored in memory, a respective magnetic reply burst having a frequency corresponding to that of said alternating magnetic field, and being transmitted prior to receipt of the next magnetic field of step (b); and wherein step (b) comprises generating said magnetic field burst signal by way of a magnetic field coil arrangement that is configured to produce a magnetic field intercepting said transponder irrespective of the orientation of said transponder, and wherein step (d) comprises receiving said response magnetic field burst emitted in step (c) by way of said magnetic field coil arrangement.

12. A system for storing and retrieving information representative of at least one characteristic of an object comprising:

a tag that is attachable to said object and contains a normally unpowered transponder having memory for storing said information, said normally unpowered transponder being powered from energy contained in a magnetic field burst signal incident thereon; and a reader that is operative to generate said magnetic field burst signal containing a plurality of magnetic field cycles of a prescribed magnetic field variation frequency, such that said magnetic field burst signal impinges upon said transponder irrespective of the orientation of said object relative to said reader; and wherein said transponder is operative, during a prescribed interval of time subsequent to receipt of said magnetic field burst generated by said reader to emit a response magnetic field burst containing a plurality of cycles of said frequency, said prescribed interval of time being associated with information stored in said memory, and said reader is operative to receive said response magnetic field burst emitted by said transponder and recover said information; and wherein said reader is operative to repetitively generate said magnetic field burst signal at successive burst intervals spaced apart in time by quiescent intervals therebetween, and wherein said transponder is operative to emit successive response magnetic field bursts during respective intervals of time between said successive magnetic field bursts received thereby, each respective interval of time being delayed relative to termination of an immediately preceding received magnetic field burst by a delay interval defined by information accessed from said programmable memory.

13. A system according to claim 12, wherein said transponder includes a transponder coil that is configured to sense said magnetic field burst generated by said reader, and wherein said transponder is operative to emit said response magnetic field burst by way of said transponder coil.

14. A system according to claim 12, wherein said reader comprises a magnetic field coil arrangement that is configured to produce a magnetic field intercepting said transponder irrespective of the orientation of said transponder.

15. A system according to claim 12, wherein said reader is installed in a hand-portable housing.

16. A system for storing and retrieving information representative of at least one characteristic of an object comprising:

a tag that is attachable to said object and contains a normally unpowered transponder having memory for storing said information, said normally unpowered transponder being powered from energy contained in a magnetic field burst signal incident thereon; and a reader that is operative to generate said magnetic field burst signal containing a plurality of magnetic field cycles of a prescribed magnetic field variation frequency, such that said magnetic field burst signal impinges upon said transponder irrespective of the orientation of said object relative to said reader; and wherein said transponder is operative, during a prescribed interval of time subsequent to receipt of said magnetic field burst generated by said reader to emit a response magnetic field burst containing a plurality of cycles of said frequency, said prescribed interval of time being associated with information stored in said memory, and said reader is operative to receive said response magnetic field burst emitted by said transponder and recover said information, said transponder includes a transponder coil that is configured to sense said magnetic field burst generated by said reader, and wherein said transponder is operative to emit said response magnetic field burst by way of said transponder coil; and wherein said transponder coil is coupled in circuit with a plurality of energy storage devices that extract and store power to operate said transponder, and provide for emission of said response magnetic field burst, from energy contained in said received successive magnetic field burst signals.

* * * * *